Oct. 4, 1932.  W. E. HUMPHREY  1,881,276
METHOD OF FABRICATING BEADS FOR PNEUMATIC TIRES
Filed Aug. 7, 1926    3 Sheets-Sheet 2
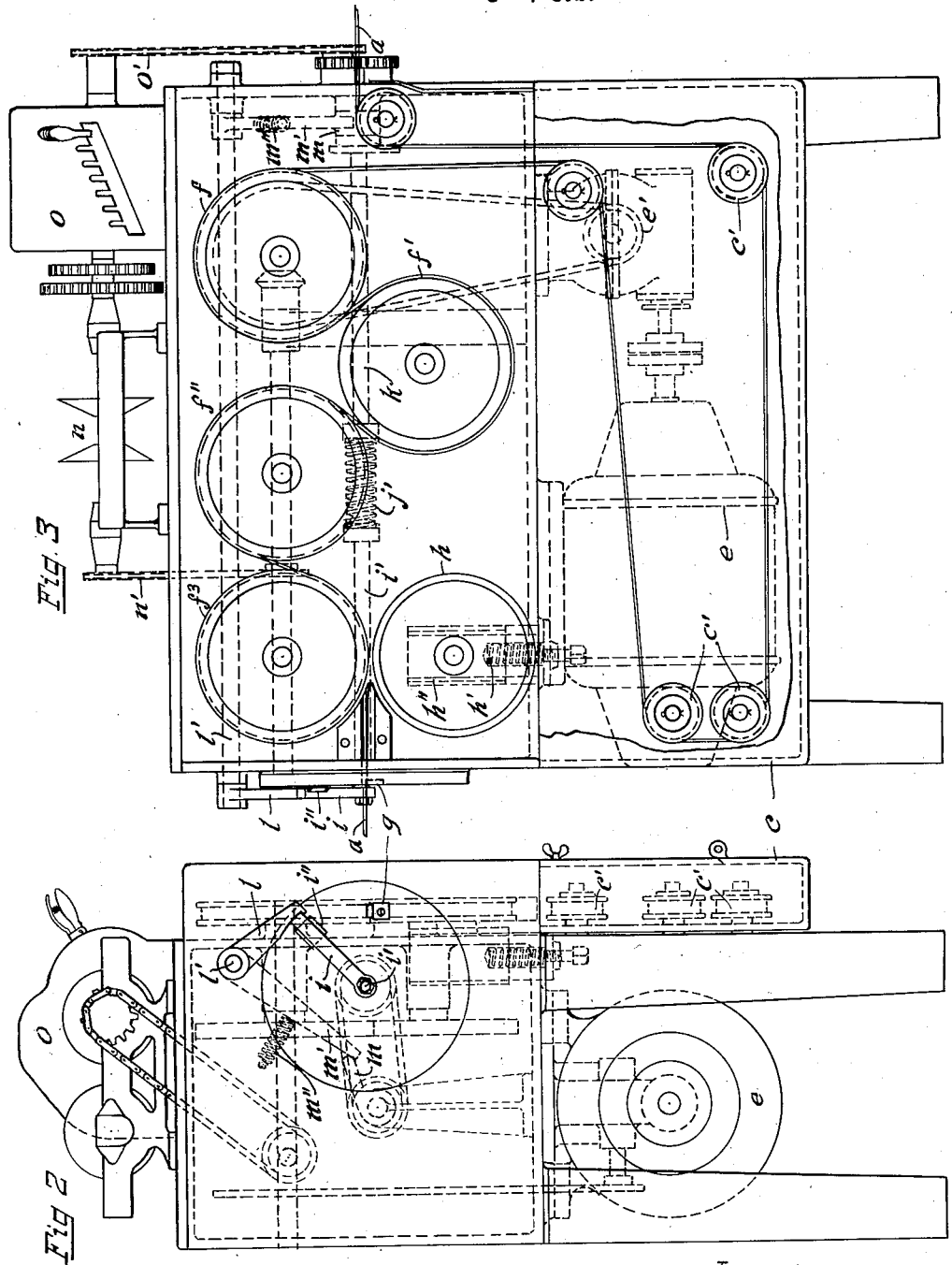
Inventor,
Walter E. Humphrey
by
Attorney Oct. 4, 1932. W. E. HUMPHREY 1,881,276
METHOD OF FABRICATING BEADS FOR PNEUMATIC TIRES
Filed Aug. 7, 1926  3 Sheets-Sheet 3
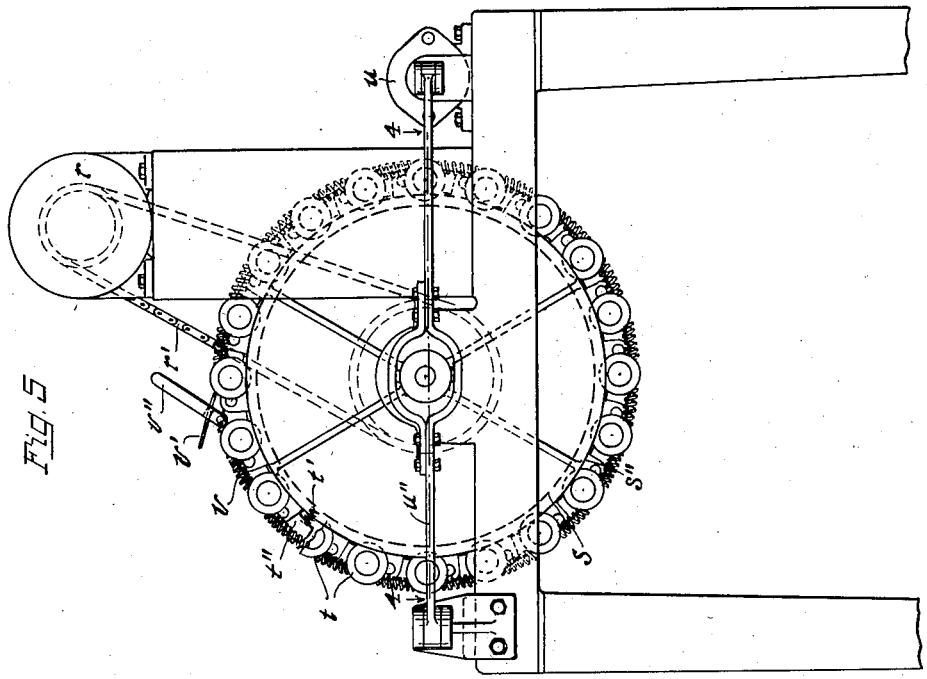
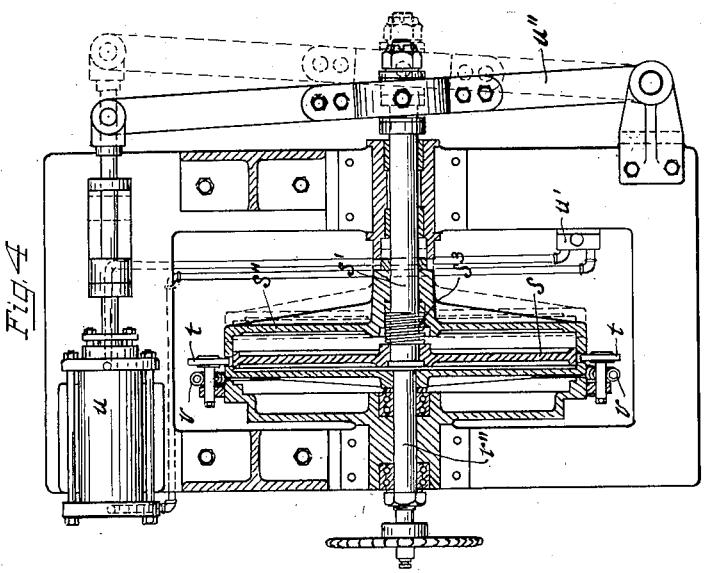
Inventor.
Walter E. Humphrey
by
Attorney.

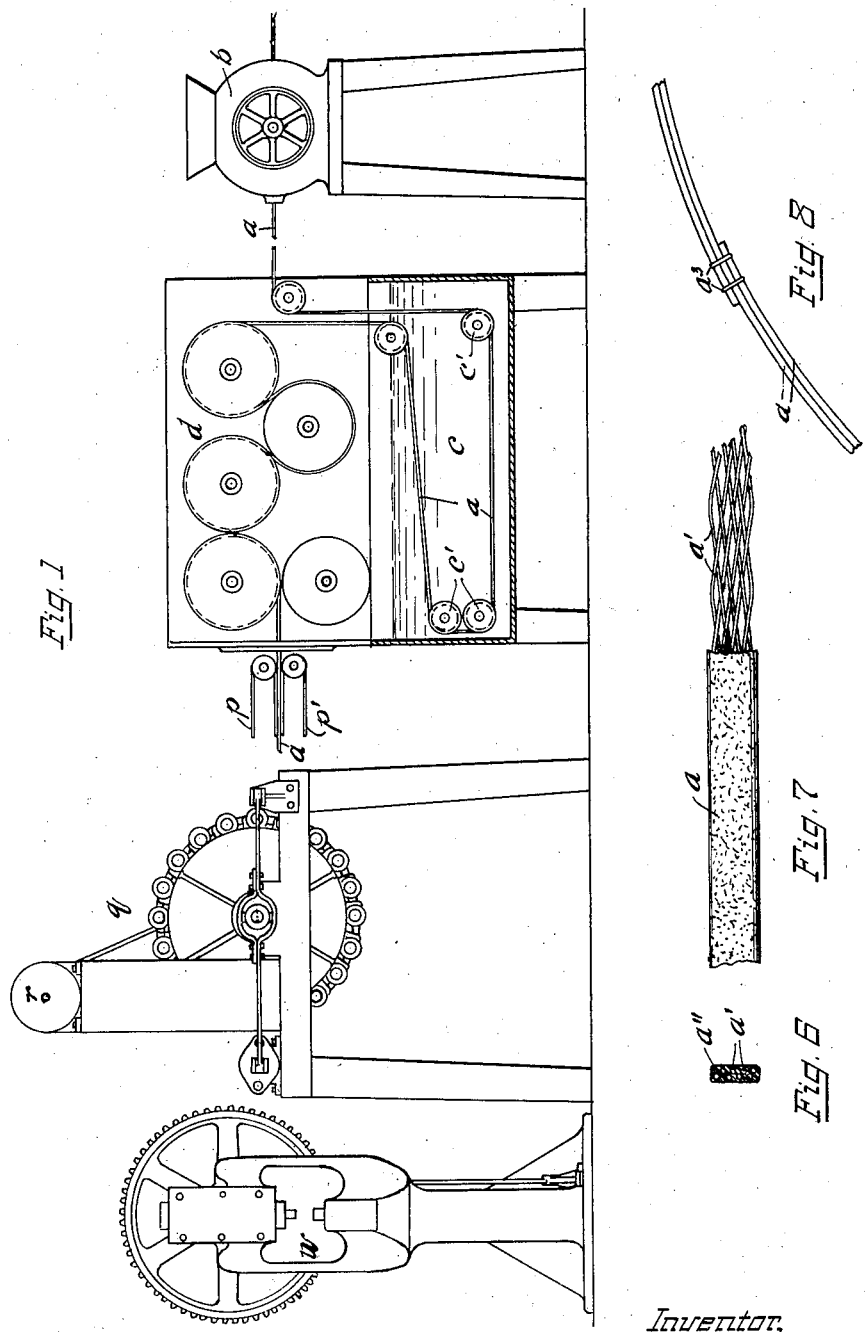

Patented Oct. 4, 1932

1,881,276

UNITED STATES PATENT OFFICE

WALTER E. HUMPHREY, OF KENT, OHIO, ASSIGNOR TO THE MASON TIRE & RUBBER CORPORATION, OF KENT, OHIO, A CORPORATION OF DELAWARE

METHOD OF FABRICATING BEADS FOR PNEUMATIC TIRES

Application filed August 7, 1926. Serial No. 127,960.

My invention relates to improvements in method of fabricating beads for pneumatic tires, and has for its object a procedure which will eliminate certain unnecessary steps therein, which are inherent in current practice, while saving in labor and expense, as well as producing more uniform and better beads.

The preferred current procedure contemplates the use of a multiple-ply wire and rubber annulus for forming these beads. The rubber is applied to the wire or wires in soft heated condition, from which it readily is disrupted and separated, while currently requiring careful precautionary measures in order to protect the uncured rubber of the bead-forming material and prevent it from sticking.

One provision for handling this material, hitherto, involved the separation or enclosing of the different strips of bead-forming material by fabric coverings manually applied and removed. Another provision for protecting the freshly made bead-forming strips involved their covering or coating with zinc stearate, which subsequently required suitable and effective measures for its removal prior to fabricating the annular bead. These, or other provisions of equivalent nature, very obviously involve considerable delay and expense, which are avoided in the practice of my instant improvement.

Furthermore, the manual cutting and shaping such bead-forming material, as previously practiced, add further delays and expense inherent with respect to prior practice, which I have likewise eliminated by devising and employing improved mechanism therefor, briefly described in the following specification, but forming no necessary part of the invention herein claimed.

Briefly describing the present and preferred procedure, in accordance with the instant invention, I may say that the bead-forming material taken directly from the "insulator" with the rubber covering thereof still in heated condition, is initially cooled by passing it though a water bath, following which it is automatically cut to predetermined length and immediately shaped to form an annular bead of two or more plies, the ends of which preferably are secured in any suitable manner. Thus the delays and unnecessary steps of the prior art above indicated, are done away with, with attendant improvement and cheapening of the expense of production.

My improved method may be better explained by making reference to the accompanying drawings, wherein:

Figure 1 is a somewhat diagrammatic showing in elevation of the associated mechanism required for, and suggestive of the several steps of my improved method.

Fig. 2 is an end view in elevation of the improved automatic bead-cutting mechanism.

Fig. 3 is a side view thereof in elevation.

Fig. 4 is a view of the bead-forming mechanism on line 4—4, Fig. 5.

Fig. 5 is a view thereof in side elevation.

Fig. 6 is a cross sectional view, and Fig. 7 is a plan view, partly broken away, illustrating a form of bead-forming material preferably used, and Fig. 8 is a fragmentary view of multiple-ply bead.

Throughout the several figures of the drawings I have employed the same character of reference to indicate similar parts.

The apparatus herein shown as adapted for the practice of the instant invention, primarily, is designed for producing and handling a continuous flattened band or strip such as I have shown in Figs. 6 and 7. Any desired number of wires $a'$ are woven or braided to form a long strip, throughout the meshes of which and about said wires a covering of soft rubber $a''$ is applied in any suitable manner. The bead-forming material $a$, as thus fabricated, is produced in continuous lengths by a "tuber" or "insulator", such as commonly is employed for applying the insulating rubber covering upon electrical conductors. The rubber is applied in its softened heated condition and under considerable pressure, and as expressed from the tuber, said rubber may very readily be disrupted and displaced from the wire core.

In order that this bead-forming material $a$ may be immediately used, it is necessary first to cool the rubber, as by leading the strip over the rollers $c'$ in the water bath $c$ of the automatic bead cutter $d$, shown in more detail in Figs. 2 and 3, and separately claimed structurally in my co-pending application, Serial No. 127,959.

Briefly describing this mechanism, I may say that it is provided with a motor $e$, connected through a reducing gear $e'$ for driving the grooved drums $f$, $f'$, $f''$ and $f^3$, over and about which the bead-forming material is carried or advanced to the cutter-plate $g$. The friction drum $h$ is pressed against the bead-forming material by means of the spring $h'$ acting upon the sliding bearing $h''$.

The cutting mechanism, per se, includes a rotated cutter-arm $i$ at the end of the shaft $i'$, mounting the blade $i''$. This shaft $i'$ is driven by the spring $j'$ connecting its inner end flexibly with the inner end of the shaft $k$. An intermittent and deferred spring-cutting action is obtained for the cutter-arm, in order to make practically an instantaneous cut at required intervals along the bead-forming material without interrupting its advance, by means of a detent $l$ mounted at the end of shaft $l'$ controlled by the rotated strip $m$ acting against the arm $m'$ and the tension of spring $m''$, to turn the shaft $l'$ and intermittently release the cutter-arm, tensioned by spring $j'$, for cutting the bead-forming material $a$ into the desired lengths.

The timing mechanism for operating the cutter-arm comprises the adjustable-gear mechanisms $n$ and $o$, interconnected with the drive of the machine by means of the chains $n'$ and $o'$, the details of which need not be explained in setting forth the present invention, which merely concern the regulation of the lengths cut from the bead-forming material.

Considering Fig. 1 again, it will now be understood that the appliance $d$ serves to convert the bead-forming material $a$ into uniform lengths, which are continuously fed thereby into a belt conveyor $p$, $p'$ which supplies the strips to the bead-former $q$, shown upon the left of Fig. 1, and in more detail in Figs. 4 and 5; this mechanism being fully described and structurally claimed in my co-pending application, Serial No. 127,957.

Next describing the bead-former sufficiently for present purposes, this being a suitable appliance for forming the annular beads as rapidly as the material is fabricated and cut to length, it will be understood that the motor $r$ is connected by the chain $r'$ to drive the shaft $r''$ and its associated members. The annular bead is formed upon the mandrel or drum $s$ mounted upon a separate shaft $s'$ within the dished stripper $s''$ and positioned by the spring $s^3$ normally to maintain said drum in rotatable position in the plane of a plurality of rollers $t$, of which twenty are shown peripherally disposed for bearing lightly upon the bead-forming material as it is given annular shape in this appliance. In order to discharge the annular bead, when thus formed, the pneumatic cylinder $u$, controlled by pressure valve $u'$, is adapted to operate lever $u''$ and withdraw the shaft $s'$, together with the members mounted thereon, into the dotted line position, thereby stripping the annular bead from the mandrel so that the parts may be restored to the position of Fig. 4, for producing another annulus.

One of the rollers $t$ in the left upper portion of Fig. 5 is shown broken away for the purpose of exhibiting the spring $t'$ acting against the pivoted arm $t''$ of the next adjacent roller. These springs afford individual resilient means for acting upon the inserted bead-forming material, but it is found that not only does the stiffness of the core or wires of such material vary considerably, but centrifugal force of the rapidly rotated annulus contributes to the formation of oversize bead-members. Therefore, these individual springs are augmented by an encircling coiled spring $v$ uniformly reacting upon all of the rollers peripherally. The tension of this spring is capable of ready adjustment, as by altering the insertion of the terminal $v'$ in the pivoted clamp $v''$. Thus the tension of the spring may be varied from time to time, not only to overcome the resilience of the bead-wires and centrifugal force, but also insure sufficient and uniform pressure of the rollers for obtaining adequate cohesion of the overlapping plies of the annular bead when rolled upon one another over the mandrel.

The overlapping ends of the multiple-ply bead are then united, as by staples $a^5$ (Fig. 8) in the stapling machine $w$, shown upon the extreme left in Fig. 1, or by any other suitable or equivalent means adapted to maintain the annular bead intact until it shall be built into the tire and vulcanized therewith.

It should be kept in mind that the bead-forming material, as thus fabricated, is relatively fragile and delicate, hence the continuous and rapid manipulation thereof in order to form the annular bead therefrom must proceed without placing undue pressure or strain thereon; this being accomplished in practicing my improved method above described, and without interrupting the feed or involving unnecessary treatment and handling of the bead-forming material. The applied pressure is readily varied to suit the conditions or particular work in hand and the plies of the annular bead are rolled into coherence without disrupting the raw rubber from the core.

The conveyor $p$, $p'$ preferably is constructed so that the bead-forming material is pressed between the rolls thereof only at the end adjacent to the bead-cutter $d$, so that said material, when cut to length, merely lies upon the lower belt p' awaiting its removal by the attendant for insertion in the bead-former q.

Having now described the method of my invention with some detail, together with sufficient showing of apparatus for practicing the same by way of illustration merely, I claim as new, and desire to secure by Letters Patent, together with such modifications as may be made by those skilled in the art, the following:—

1. The method of fabricating beads, which consists in embedding and covering a wire core with rubber by forming the rubber about the wire while the rubber is in heated condition, cooling said bead-forming material thus produced, feeding at approximately the rate of production, cutting it meanwhile to the desired length, and shaping an annular bead therefrom by rolling and applying pressure radially at short intervals along the periphery to effect the coherence of a plurality of plies; all as a single continuing operation, substantially as set forth.

2. The method of fabricating beads for tire building, which consists in cutting the freshly coated bead-forming wires into predetermined lengths, rolling the material into annular cohering plies by applying regulated pressure radially thereto at short intervals throughout the periphery, and securing the outer end to the annulus thus formed.

3. The method of fabricating beads for tire building, which consists in leading a plurality of wires in interstitially grouped relation through a supply of heated rubber, forcing a mass of such rubber about said interstitially grouped wires to embed the same therein and form a composite bead-building tape, partially cooling said tape, and winding a plurality of layers thereof into an annulus for forming said bead, substantially as set forth.

4. The method of fabricating beads for tire building, which consists in conducting a group of wires through a die, forcing a mass of heated tenacious rubber in and about the wires and thereby forming a composite tape, cooling said tape, winding a length thereof into annulus form, and meantime peripherally compressing plies of the annulus upon each other by pressure applied at short intervals to form an accurately sized and coherent bead member, substantially as set forth.

5. The method of fabricating beads for tire building which comprises conducting a group of wires through a die, forcing a mass of tenacious rubber in and about the group of wires to form a composite tape, winding a length of said tape into annulus form, and applying pressure to the annulus at intervals spaced peripherally around the same.

6. The method of making tire beads which comprises constantly feeding a core composed of interstitially grouped wires, embedding the core in rubber by forcing the rubber in and about the interstitially grouped wires, severing successive lengths from the leading end of the bead forming material thus produced, and then winding each of said lengths into an annulus.

In testimony whereof I do now affix my signature.

WALTER E. HUMPHREY.